United States Patent Office 3,442,149
Patented May 6, 1969

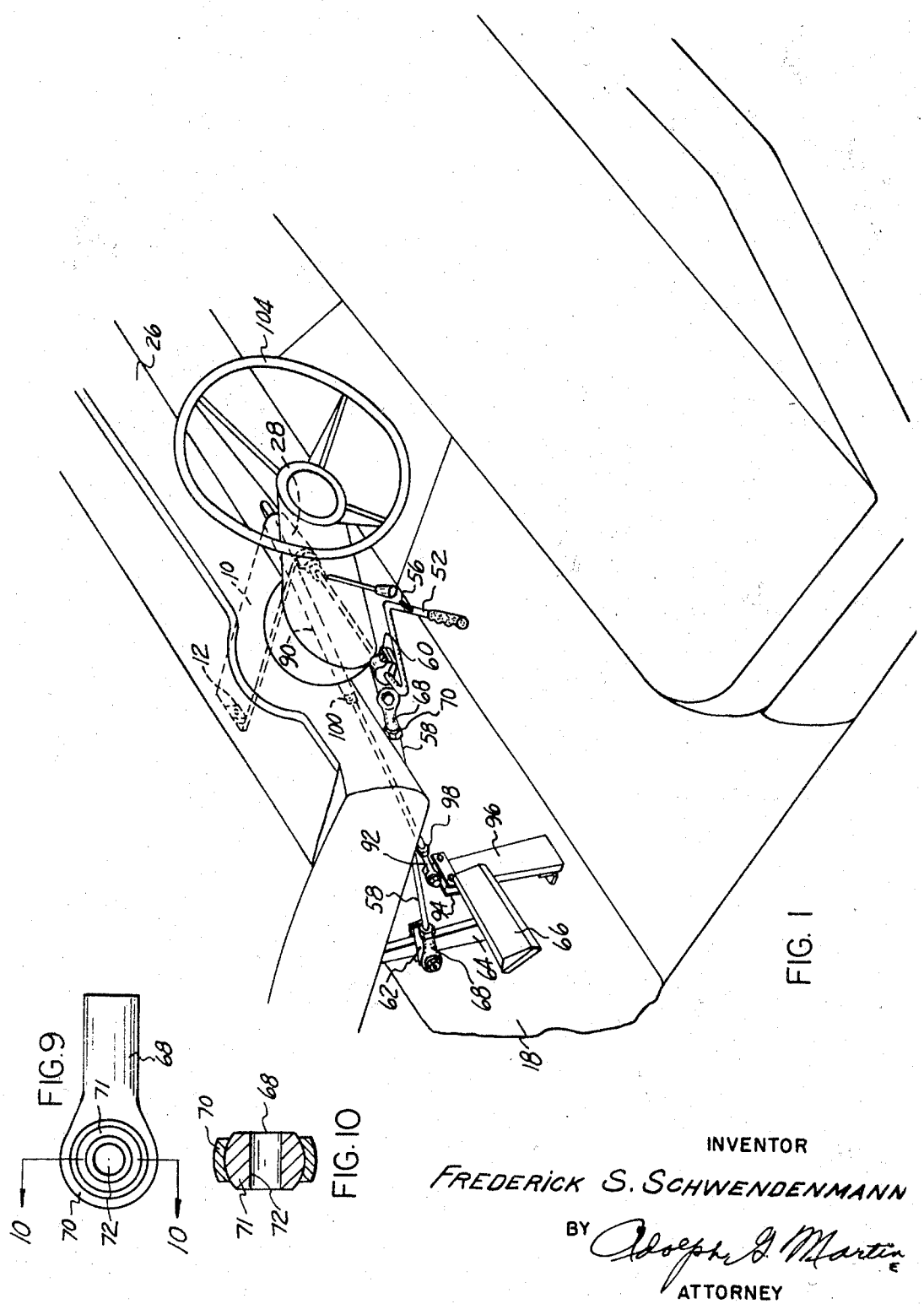

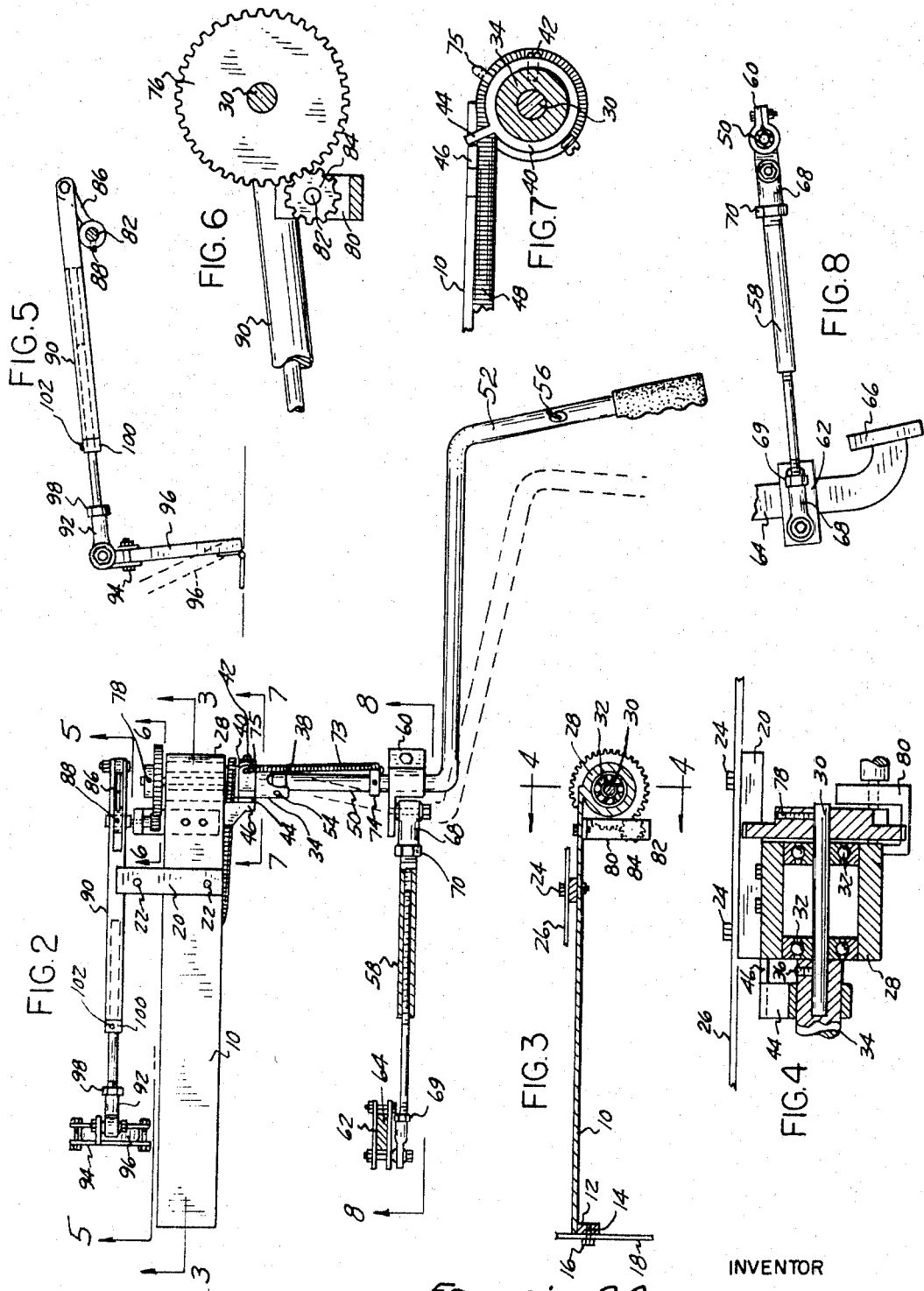

3,442,149
HAND MANIPULATED CONTROL FOR OPERATING MOTOR VEHICLES
Frederick S. Schwendenmann, 10123 Tecumseh, Detroit, Mich. 48239
Filed Sept. 22, 1967, Ser. No. 669,812
Int. Cl. G05g 11/00
U.S. Cl. 74—481                    4 Claims

ABSTRACT OF THE DISCLOSURE

A hand manipulated control for operating motor vehicles which consists of a bracket mountable under the instrument panel supporting an operator arm adjacent the steering wheel. Lost motion linkage operatively connected to the operator arm, is attachable to the brake lever and accelerator pedal respectively, so that the same may be separately and selectively operated.

Background of the invention

This invention relates generally to remote controls for motor vehicles, and more particularly to a manual control for manipulating the brake and accelerator pedals of an automobile. Most remote control devices used by physically handicapped drivers are difficult to install, and must be carefully adjusted to provide satisfactory performance. Furthermore, such devices are not sturdily constructed and consequently require considerable service and maintenance to insure easy and reliable operation. All controls of this type consistently fail to provide the ease of manipulation which is so essential for the physically handicapped.

Summary of the invention

This invention comprises a mounting bracket supporting a pivoted operator arm which selectively manipulates a pair of adjustable connector rods attachable respectively to the brake lever and accelerator pedal of a motor vehicle. Resilient members automatically return the operator arm to a position of rest when it is released by the driver thereby removing the operating force from the brakes and accelerator.

Brief description of the drawing

FIGURE 1 is a fragmentary perspective view showing the applicant's control mounted on a motor vehicle.

FIGURE 2 is a top plan view of the applicant's control detached from the motor vehicle, showing the coil spring 72 connected between the collar 40 and the ring 74 on the operator arm 50.

FIGURE 3 is a section view, taken substantially on plane 3—3 in FIGURE 2, showing the drive shaft 30 supported by the ball bearings 32 in the circular housing 28.

FIGURE 4 is an enlarged section view, taken substantially on plane 4—4 in FIGURE 3, showing structural details of the circular housing 28 and the hanger 80 on the mounting bracket 10.

FIGURE 5 is a section view, taken substantially on plane 5—5 in FIGURE 2, showing the adjustable telescopic connector rod 90 attached between the accelerator pedal 96 and the crank 86.

FIGURE 6 is an enlarged section view, taken substantially on plane 6—6 in FIGURE 2, showing the spur gear 76 on the drive shaft 30 and the pinnion gear 84 on the crank shaft 82.

FIGURE 7 is an enlarged section view, taken substantially on plane 7—7 in FIGURE 2, showing the adjustable collar 40 on the cap 34 and the attachment of the coil spring 48 to the collar 40.

FIGURE 8 is a section view, taken substantially on plane 8—8 in FIGURE 2, showing the adjustable telescopic connector rod 58 attached between the brake lever 64 and the operator arm 50.

FIGURE 9 is an enlarged elevation view showing the rod end bearing 68 detached from the adjustable telescopic connector rod 58.

FIGURE 10 is a section view, taken substantially on plane 10—10 in FIGURE 9, showing structural details of the rod end bearing 68.

For a more detailed description of the invention, reference is made to the drawing in which numeral 10 designates an elongated mounting bracket having a downwardly disposed flange 12 on the back end with a threaded opening 14 therein to receive a bolt 16 for attaching the mounting bracket 10 to the fire wall 18 of a motor vehicle partially shown in FIGURE 1. A cross member 20, on the forward portion of the mounting bracket 10, is provided with spaced openings 22 to receive bolts 24 for attaching the bracket 10 to the lower side of the vehicle instrument panel 26.

A circular housing 28, on the forward end of the mounting bracket 10, has therethrough a drive shaft 30 supported for rotation by ball bearings 32. A cap 34, adjustably attached on one end of the drive shaft 30 by a set screw 36, has thereon an axially disposed clevis 38. A collar 40 on the cap 34 is adjustably secured thereto by a set screw 42. A radially projecting tab 44 on the collar 40 contacts a fixed stop 46 on the mounting bracket 10 to provide a reverse travel limit for the drive shaft 30.

A coil spring 48 is attached between the cap 34 and the mounting bracket 10 so as yieldably to hold the drive shaft 30 at its reverse limit of travel. An operator arm 50, having a lateral handle 52, is pivotally connected to the clevis 38 by a pin 54. A toggle switch 56 is mounted in the lateral handle 52, for connection into the electrical circuit of a vehicle in the customary manner for use as a dimmer switch. An adjustable telescopic connector rod 58 is attached to the operator arm 50 by a clamp 60.

A clamp 62, on the other end of the connector rod 58, is attached to the lever 64 of the brake pedal 66 on the motor vehicle, as shown in FIGURES 1 and 8. A rod end bearing 68, threaded on the outer end of each telescopic member of the connector rod 58, has adjacent thereto a lock nut 69. The rod end bearing 68 comprises a circular casing 70 swivelly holding a ball section 71 having therethrough a transverse axial opening 72.

A coil spring 73, connected between an adjustable ring 74 on the operator arm 50 and a tab 75 on the collar 40, yieldably holds the operator arm 50 in a retracted position, as shown by the full lines in FIGURES 1 and 2. A spur gear 76 is adjustably secured to the drive shaft 30 by a set screw 78. A hanger 80, suspended from the mounting bracket 10, rotatably supports a crankshaft 82. A pinion gear 84 on the crankshaft 82, is engaged with the spur gear 76 on the drive shaft 30.

A crank 86 is adjustably secured on the crankshaft 82 by a set screw 88, and attached to one end of a telescopic connector rod 90. A rod end bearing 92 attaches the other end of the telescopic connector rod 90 to a clamp 94 on the accelerator pedal 96 of a motor vehicle as shown in FIGURES 1, 2 and 5. A lock nut 98 is provided on the connector rod 90, adjacent the rod end bearing 92. A slidable ring 100 is adjustably secured on the connector rod 90 by a set screw 102.

The preceding discussion completes a description of the structural details of the applicant's invention; however, to comprehand more fully the subject matter herein presented, a discussion is next directed to the manner in which the control is used and operated to perform its intended function.

Use and operation

In use, the applicant's control, when mounted on the vehicle as shown in FIGURE 1, must first be adjusted before it is placed in operation. To accomplish this, the length of the connector rod 58, attached to the lever 64 of the brake pedal 66, is adjusted so that the lateral handle 52 on the operator arm 50 is disposed adjacent the steering wheel 104 of the vehicle. The slidable ring 100 on the connector rod 58, attached to the accelerator pedal 96, is then adjusted so that any forward or clockwise rotation of the lateral handle 52, as viewed in FIGURE 2, depresses the accelerator pedal 96.

The control is now operational, and when the tranmission is engaged, the driver merely pivots the lateral handle 52 forward or clockwise, thereby driving the crankshaft 82 counter-clockwise, as viewed in FIGURE 6. This causes the crank 86 to move the connector rod 90 so as to depress the accelerator pedal 96 to provide the desired vehicle speed. When the driver wishes to stop the vehicle, he merely releases the torque or turning effort on the lateral handle 52, whereupon the coil spring 48 automatically returns the drive shaft 30 to its reverse limit of travel, as provided by the fixed stop 46.

This places the accelerator pedal 96 in its idling position, whereupon the driver may push the lateral handle 52 to the broken line position shown in FIGURE 2, which moves the connector rod 58 so as to depress the brake pedal 66 and bring the vehicle to a stop. The applicant's control is designed for use exclusively on vehicles equipped with automatic transmissions. It is recommended that the vehicles also be provided with power brakes so as to reduce the amount of force required on the lateral handle 52 to control the vehicle.

In practice, it may be necessary to alter slightly the size and shape of the mounting bracket 10 on the applicant's control to adapt it for use on the various makes and models of motor vehicles. Based upon the foregoing discussion, the applicant is of the opinion that his invention has fulfilled a long-felt need in the field of motor vehicle controls, and that he has made a valuable and significant contribution to the related art. However, while the invention was described with reference to the structural details of a single embodiment, the principles involved are susceptible of numerous other practical adaptations.

Therefore, I claim as new and desire to secure by Letters Patent:

1. A hand manipulated control for operating a motor vehicle having an instrument panel, a fire wall, a steering column, a steering wheel rotatably mounted on the steering column, an accelerator pedal, and a brake lever, such control comprising a mounting bracket attachable to the vehicle adjacent the steering column, a housing on the mounting bracket, a horizontally disposed drive shaft supported for rotation in the housing, a spur gear on the drive shaft, a crank shaft rotatably supported by the mounting bracket, a pinion gear on the crank shaft driven by the spur gear, a crank on the crankshaft, a connector rod for attaching the crank to the accelerator pedal, an operator arm having a forward and a retracted position hinged on the other end of the drive shaft, an adjustable connector rod for attaching the operator arm to the brake lever, means providing a reverse travel limit position for the drive shaft which produces a pre-selected idling speed for the vehicle motor, resilient means connected between the mounting bracket and the drive shaft yieldably holding the latter in its reverse travel limit position, and resilient means yieldably holding the operator arm in its retracted position in which no operating force is being applied to the brake lever.

2. The hand manipulated control of claim 1 in which the means providing a reverse travel limit position for the drive shaft comprises a fixed stop on the mounting bracket, an adjustable collar on the drive shaft adjacent the operator arm, and a tab on the collar for engaging the fixed stop.

3. The hand manipulated control of claim 2 in which the resilient means yieldably holding the operator arm in its retracted position comprises a coil spring connected between the adjustable collar and the operator arm.

4. The hand manipulated control of claim 3 in which the mounting bracket comprises an elongated member having on one end a downwardly disposed flange for attachment to the fire wall of the vehicle, and a cross member adjacent the other end for attachment to the lower side of the instrument panel of the vehicle.

References Cited

UNITED STATES PATENTS

| 2,602,348 | 7/1952 | Wilson | 74—481 X |
| 2,658,409 | 11/1953 | Hughes | 74—481 X |
| 2,949,044 | 8/1960 | Hughes | 74—481 |
| 3,373,628 | 3/1968 | Lake et al. | 74—484 |

MILTON KAUFMAN, *Primary Examiner.*

U.S. Cl. X.R.

74—484